United States Patent
Vetterli et al.

(10) Patent No.: US 9,008,202 B2
(45) Date of Patent: Apr. 14, 2015

(54) FAST AND ROBUST ESTIMATION OF JOINTLY SPARSE CHANNELS

(71) Applicant: QUALCOMM Incorporated, San Diego, CA (US)

(72) Inventors: Martin Vetterli, Grandvaux (CH); Yann Barbotin, Renens (CH)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/791,606

(22) Filed: Mar. 8, 2013

(65) Prior Publication Data

US 2013/0243046 A1  Sep. 19, 2013

Related U.S. Application Data

(60) Provisional application No. 61/610,326, filed on Mar. 13, 2012.

(51) Int. Cl.
*H04L 27/28* (2006.01)
*H04L 25/02* (2006.01)
*H04L 25/03* (2006.01)
*H04L 5/00* (2006.01)

(52) U.S. Cl.
CPC ...... *H04L 25/0202* (2013.01); *H04L 25/03987* (2013.01); *H04L 5/0048* (2013.01); *H04L 25/0204* (2013.01)

(58) Field of Classification Search
USPC .......................................... 375/260, 347, 299
See application file for complete search history.

(56) References Cited

U.S. PATENT DOCUMENTS

| | | | |
|---|---|---|---|
| 7,801,210 B2 | 9/2010 | Zhang et al. | |
| 2004/0179483 A1 | 9/2004 | Perlow et al. | |
| 2007/0171960 A1 | 7/2007 | Zhang et al. | |
| 2008/0273583 A1 | 11/2008 | Song et al. | |
| 2008/0310485 A1 * | 12/2008 | Soliman et al. | 375/147 |
| 2010/0074358 A1 | 3/2010 | Khojastepour et al. | |
| 2010/0215081 A1 | 8/2010 | Bajwa et al. | |
| 2011/0103500 A1 | 5/2011 | Vetterli et al. | |
| 2012/0201320 A1 * | 8/2012 | Koike-Akino | 375/267 |

OTHER PUBLICATIONS

Barbotin, et al., "Estimation of Sparse MIMO Channels with Common Support", submitted to IEEE Transactions on Communications, Jul. 7, 2011, XP55014316, Retrieved from the Internet: URL: http://arxiv.org/PS_cache/arxiv/pdf/1107/1107.1339v1.pdf [retrieved on Dec. 8, 2011]; pp. 1-12.

(Continued)

*Primary Examiner* — Kevin Kim
(74) *Attorney, Agent, or Firm* — Knobbe Martens Olson & Bear LLP

(57) ABSTRACT

A device and method for estimating multipath jointly sparse channels. The method comprises receiving a number K of signal components by a number P of receiving antennas, where P≥2. The method further comprises estimating the sparsity condition of the multipath jointly sparse channels. The method further comprises, if the sparsity condition is not satisfied, estimating the channels by using a non-sparse technique. The method further comprises, if the sparsity condition is satisfied, estimating the channels by using a sparse technique.

54 Claims, 4 Drawing Sheets

(56) References Cited

OTHER PUBLICATIONS

International Search Report and Written Opinion—PCT/US2013/030260—ISA/EPO—Jul. 30, 2013.

Barbotin Y., et al., "Fast and Robust Parametric Estimation of Jointly Sparse Channels," Submitted to IEEE Journal on Emerging and Selected Topics in Circuits and Systems, Sep. 2012, pp. 1-11.

* cited by examiner

FAST AND ROBUST ESTIMATION OF JOINTLY SPARSE CHANNELS

CROSS-REFERENCE TO RELATED APPLICATIONS

This application claims priority to U.S. Provisional Application No. 61/610,326 filed Mar. 13, 2012, which is hereby expressly incorporated in its entirety by reference herein.

FIELD

The present invention relates to a method for estimating jointly sparse channels; and in particular, to a method for estimating jointly sparse channels in which the sparsity condition of the jointly sparse channels is first estimated and a non-sparse technique or sparse technique is used to estimate the channels depending on the estimated sparsity.

BACKGROUND

Communication between two parties across a communication channel, between a transmitter and receiver, are subject to unknowns such as noise and filtering by the channel's impulse response (CIR). The CIR of a communication channel characterizes the channel. The CIR is uniquely defined by a set of parameters (the set of parameters usually comprise amplitudes and times of flight of reflections of a transmitted impulse signal). With respect to decoding, the noise is treated as nuisance parameters, and the parameters of the CIR as unknowns which are to be estimated as precisely as possible to maximize the accuracy of decoding of transmitted signals.

The estimation of the parameters of the CIR is referred to in the art as "channel estimation". In order to estimate the coefficients of the CIR, the communication channel can be used to transmit a signal known at both ends i.e. a pilot signal (pilots), to gain knowledge about the CIR. This dictates a trade-off between the portion of the communication channel reserved for the transmission of pilots (and thus lost to data transmission) and the decoding error rate due to bad channel estimation, both affecting the communication bitrate. Channel estimation therefore requires the selection of pilots and the design of an estimation algorithm used for estimating the channel parameters.

The pilots provide information about the CIR, and so does an a priori knowledge about the communication channel's model (such as whether the channel is multipath, flat-fading, scattering, and/or band-limited). In the ideal case wherein the communication channel is noiseless, when an impulse signal is passed from a transmitter to a receiver along the channel, the CIR can be perfectly recovered with a finite set of samples of the signal received at the receiver provided the channel perfectly obeys the a priori known channel model; thus a sampling theorem is defined. If the pilots give uniform samples in time at the Nyquist rate and if the CIR is band-limited with a bandwidth lower than, or equal to, the Nyquist rate, then the CIR can be perfectly reconstructed from the finite set of samples.

A multipath channel is a channel which has a CIR which comprises K components wherein K is an integer number greater than or equal to 1. Each of the K components corresponds to a reflection of the transmitted impulse signal from a scatterer. Each of the K components is defined by two parameters which are: a time of arrival of the reflection at a receiver and an amplitude of the reflection. Therefore, each CIR of a multipath channel is defined by K*2 parameters. The amplitudes may be a complex value and the time of flights may be real values.

SUMMARY

The systems, methods and devices of this disclosure each have several innovative aspects, no single one of which is solely responsible for the desirable attributes disclosed herein.

One aspect of this disclosure provides an apparatus and method for estimating multipath jointly sparse channels. The method includes receiving a number K of signal components by a number P of receiving antennas, where P≥2. The method further includes estimating the sparsity condition of the multipath jointly sparse channels. The method further includes, if the sparsity condition is not satisfied, estimating the channels by using a non-sparse technique. The method further includes, if the sparsity condition is satisfied, estimating the channels by using a sparse technique. The apparatus includes a transmitting antenna for transmitting a signal. The apparatus further includes a number P of receiving antennas, where P≥2, for receiving a number K of signal components. The apparatus further includes a processor configured to estimate the sparsity condition of the multipath jointly sparse channels. The process is further configured to estimates the channels by using a non-sparse technique if the sparsity condition is not satisfied. The processor is further configured to estimate the channels by using a sparse technique if the sparsity condition is satisfied. In another embodiment, the apparatus includes means for transmitting a signal, and a plurality of means for receiving a number K of signal components. The apparatus further includes means for estimating the sparsity condition of the multipath jointly sparse channels. The apparatus further includes means for estimating the channels by using a non-sparse technique if the sparsity condition is not satisfied. The apparatus further includes means for estimating the channels by using a sparse technique if the sparsity condition is satisfied.

BRIEF DESCRIPTION OF THE DRAWINGS

The invention will be better understood with the aid of the description of an embodiment, which is given by way of example only, and illustrated by the figures, in which.

DETAILED DESCRIPTION

Figure 1:
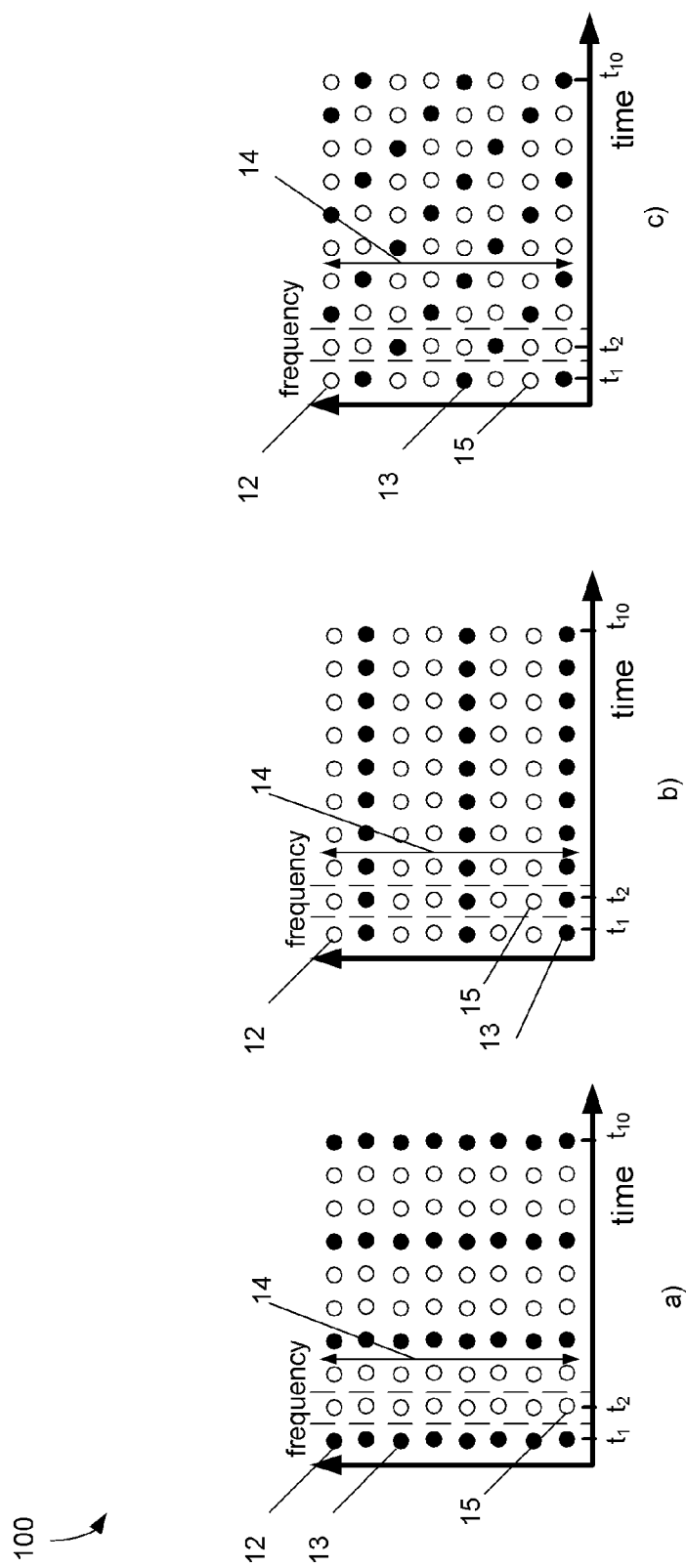
FIGS. 1a-c illustrate examples of layouts of pilot signals which could be used in the method of the present invention.

The present invention is concerned with sparse common support (SCS) channels. Sparse common support SCS channels are multipath channels, which have CIR's which have at least one common time of arrival parameter, and which are band-limited.

According to one embodiment of the invention, there is provided a method for estimating multipath jointly sparse channels comprising: receiving a number K of signal components by a number P of receiving antennas, where P≥2; estimating the sparsity condition of the multipath jointly sparse channels; if the sparsity condition is not satisfied, estimating the channels by using a non-sparse technique; if the sparsity condition is satisfied, estimating the channels by using a sparse technique.

There is further provided a method for estimating multipath jointly sparse channels comprising: transmitting a signal from a transmitting antenna; determining the number K of signal components received by a number P of receiving antennas, where P≥2; said determining comprising; calculating K singular values by using singular value decomposition of a matrix ok rank K to which some noise has been added; calculating the sequence of the partial effective ranks of said matrix based on said sequence, determining the rank K.

Additional, favorable, features for each of the above-mentioned methods are recited in the listed dependent claims. There is further provided computer-readable storage medium encoded with instructions for causing a programmable processor to perform any of the methods of the present invention.

There is further provided an apparatus for estimating multipath jointly sparse channels comprising: a transmitting antenna for transmitting a signal; a number P of receiving antennas, where P≥2, for receiving a number K of signal components; a first module for estimating the sparsity condition of the multipath jointly sparse channels; a second module for estimating the channels by using a non-sparse technique if the sparsity condition is not satisfied; a third module for estimating the channels by using a sparse technique if the sparsity condition is satisfied.

There is further provided an apparatus for estimating multipath jointly sparse channels comprising: means for transmitting a signal; a number P, where P≥2, of means for receiving a number K of signal components; means for estimating the sparsity condition of the multipath jointly sparse channels; means for estimating the channels by using a non-sparse technique if the sparsity condition is not satisfied; means for estimating the channels by using a sparse technique if the sparsity condition is satisfied.

There is further provided an apparatus for estimating multipath jointly sparse channels comprising: a first module for estimating the sparsity condition of multipath jointly sparse channels; a second module for estimating the channels by using a non-sparse technique if the sparsity condition is not satisfied; a third module for estimating the channels by using a sparse technique if the sparsity condition is satisfied.

Additional, favorable, features for each of the above-mentioned apparatuses are recited in the listed dependent claims.

The present invention provides an estimation algorithm and may uses uniform discrete Fourier transform (DFT) pilot signal. Examples layouts for possible pilot signals which may be used in the present invention are shown in FIGS. 1a-c; these layouts are found in modern communication standards using orthogonal frequency-division multiplexing (OFDM). It will be understood that pilot signal with other layouts may also be used in the present invention. Referring to FIGS. 1a-c, in pilot assisted OFDM communications, time-frequency slots are reserved (black slots) for pilots, thus providing a sampling of the CIR in time and frequency. The decimation factor is denoted as D; it represents the gap between pilots in each period of the pilot signal. In the case of FIGS. 1b and 1c the decimation factor is D=3. FIG. 1a shows a block layout for a pilot signal. FIG. 1b shows a comb layout for a pilot signal and FIG. 1c shows a scattered layout for a pilot signal. These layouts will be described in more detail later.

The pilots provide information about the CIR, and so does an a priori knowledge about the channel's structure including the sparsity, common support and limited delay-spread of the channel. In the noiseless case, the CIR can be perfectly recovered with a finite set of samples if the channel perfectly obeys the a priori known channel structure, thus providing a sampling theorem e.g., uniform pilots in time at the Nyquist rate characterize uniquely bandlimited signals.

The algorithm/method of the present invention is preferably applied to sparse common support (SCS) channels. The present invention addresses the estimation of SCS channels from DFT-domain measurements (pilots). SCS channels estimation with FRI is known from the prior art ("*Estimation of sparse MIMO channels with common support* IEE Trans. Commun., 2012, of E Barbotin, A Hormati, S Rangan, and M Vetterli) but the present invention focuses on computational issues and robustness. In one embodiment, the invention aims to improve the robustness and computational complexity aspects of known, finite rate of innovation (FRI)-based sampling and estimation algorithms.

The method of present invention is based on projection in Krylov subspaces to improve complexity and a new criterion called the partial effective rank (PER) to estimate the level of sparsity to gain robustness.

If P antennas measure a K-multipath channel with N uniformly sampled measurements per channel, the algorithm of the present invention possesses an $O(KPN \log N)$ complexity and an $O(KPN)$ memory footprint instead of $O(PN^3)$ and $O(PN^2)$ for the direct implementation, making it suitable for K≪N, wherein K is the number of sparse components, P is the number of channels, and N is the number of collected samples per channel.

The level of sparsity may be estimated online based on the PER, and the algorithm of the present invention therefore has a sense of introspection, being able to relinquish sparsity if it is lacking. The PER is provides for robustness which adds only a marginal $O(K^2)$ cost to be evaluated online. Details of the publication "*The effective rank: A measure of effective dimensionality*" *in Eur. Signal Process. Conf (EUSIPCO)*, 2007, pp. 606-610, of O. Roy and M. Vetterli, are incorporated by reference.

The sparsity level of a channel is unknown in practice, and a heuristic estimate of the sparsity level of a channel is derived using the partial effective rank (PER). The PER used to derive a heuristic estimate of K requires little overhead. The PER tracks the "effective dimension" of the Krylov subspace as its size is increased, and can therefore be estimated online.

The heuristic may fail if the channel is not sparse enough, giving a beneficial sense of adequacy to the algorithm. In such nonsparse cases, the algorithm will yield to a non-sparse estimation method.

The main advantage of the present invention is to have a computation and memory cost proportional to the sparsity level K. The algorithm/method of the present invention relies on FFT evaluations for the heavy load computations, which is particularly appealing for embedded DSP applications. This acceleration is applicable to any subspace identification problem where the data matrix has a Toeplitz structure.

In certain embodiments of the application, the joint estimation of multipath channels obtained with a set of receiving antennas and uniformly probed in the frequency domain, is considered. This scenario fits most of the modern outdoor communication protocols for mobile access (ETSI Std. 125 913) or digital broadcasting (ETSI Std. 300 744) among others. Such multipath channels verify a sparse common support (SCS) property which used in to propose a finite rate of innovation (FRI)-based sampling and estimation algorithm.

The method/algorithm of the present invention is outperforms nonsparse reconstruction in the medium to low signal-to-noise ratio range (≤0 dB). The method/algorithm of the present invention also does not perform worse than a non-sparse estimation algorithm in non-sparse operating conditions Referring now to FIG. 2 there is shown, a transmitting device Tx transmitting an impulse signal, across the 'P' SCS channels, to a receiving device Rx which comprises multiple antennas. The impulse signal is known by both the transmitting device Tx and the receiving device Rx, and so the receiving device Rx can infer, from the signals which it receives at each of its multiple antennas, the impulse response of each of the 'P' channels. The medium between the transmitting device Tx and receiving device Rx contains K scatterers. Each scatterer acts as a reflector, and reflects part of the impulse pulse signal which is transmitted from the transmitting device Tx to the receiving device Rx. As discussed each reflection from a scatterer, will generate a component of a channel's impulse response.

Figure 2:
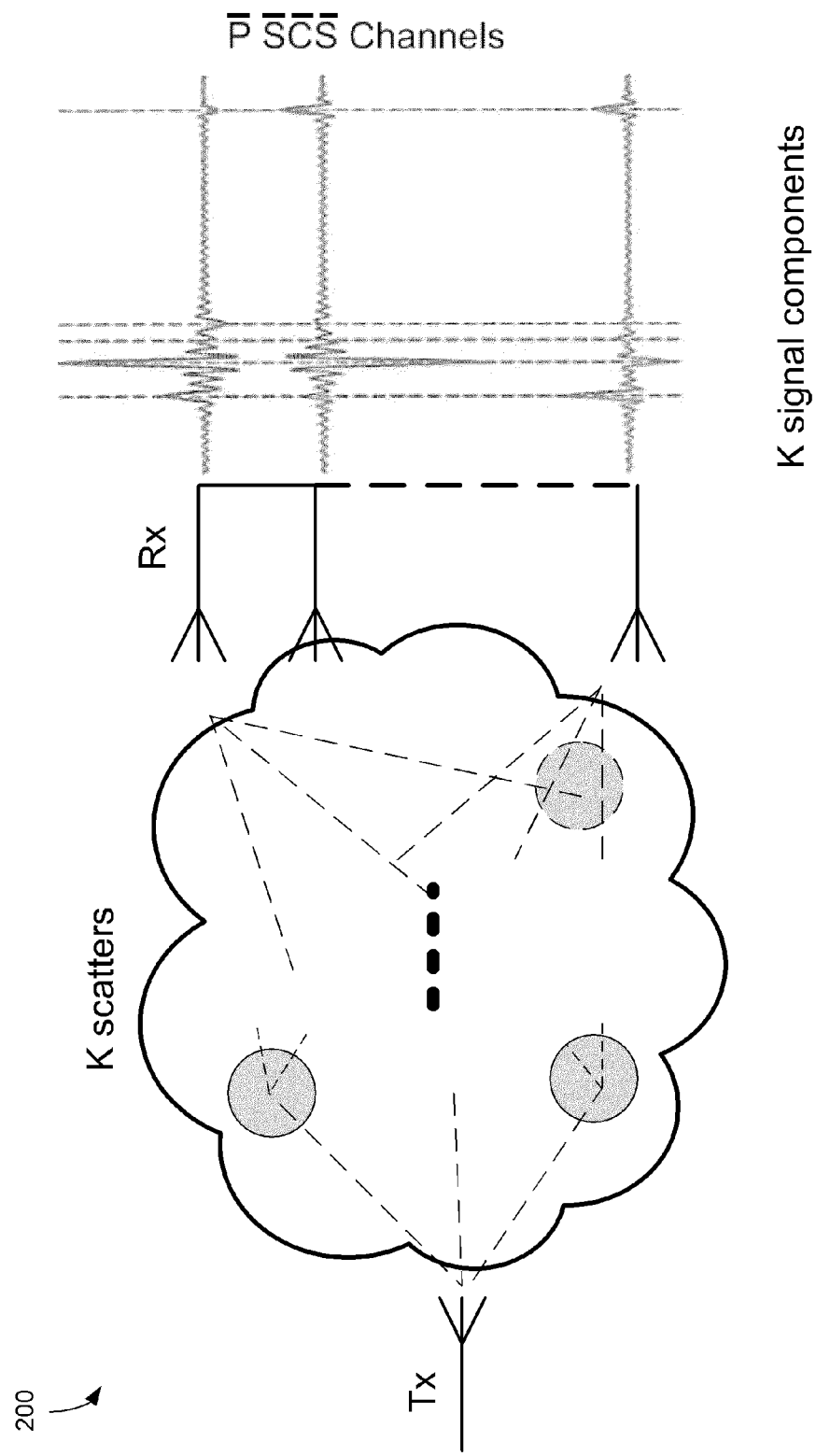
FIG. 2 illustrate a transmitting device Tx transmitting an impulse signal, across the 'P' sparse common support channels, to a receiving device Rx which comprises multiple antennas.

The impulse signal which is transmitted from transmitting device Tx and received at each of multiple antennas at the receiving device Rx has K components (i.e. the CIR has K components); each of the K scatterers contributes one component to the CIR so that the number of components in the CIR is equal to the number of scatterers. FIG. 2 illustrates a simplified scenario wherein each of the K scatterers contributes a single component to the CIR of each channel.

The 'P' SCS channels will result in 'P' difference CIRs. FIG. 2 shows 'P' CIR's from 'P' ideal SCS channels each of bandwidth B, and each having K components aligned in time indicating that the components defining the CIR's each have an equal time of arrival.

If the amplitude parameters are complex the total number of unknown parameters which define all of the P channels is (2P+1)*K i.e. K times of arrival, and for each channel K complex amplitudes each having a real and imaginary part each being unknown providing 2PK unknown parameters; thus providing a total of (2P+1) K unknown parameters.

If the P channels are not common support, but are still sparse (i.e. have a number of components K are at least one order of magnitude smaller than the Nyquist sampling rate), there will be a different time of flight for each of the K components of each channel; this will result in 3PK unknown parameters.

If the 'P' channels which are band limited only, and which are not common support, or 2PB unknown parameters, wherein B is the bandwidth of the channel and is equal to the Nyquist sampling rate.

Estimation of the CIR unknown parameters based on the channel's model (such as whether the channel is multipath, flat-fading, scattering, and/or band-limited) may not lead to a trivial linear system of equations. The estimation of CIR parameters in SCS channels is non-linear. The CIR parameters in SCS channels can be exactly estimated using a finite rate of innovation (FRI) sampling algorithm. The use of an SCS-FRI algorithm (Sparse common support channel finite rate of innovation sampling algorithm) to estimate the CIR (i.e. to estimate the parameters of the CIR) of SCS channels is known from the publication "*Estimation of sparse MIMO channels with common support\* IEE Trans. Commun.*, 2012, of Y. Barbotin, A Hormati, S Rangan, and M Vetterli. The use of an SCS-FRI algorithm to estimate the CIR parameters of the SCS channels is complex and thus demands high processing power.

Figure 3:
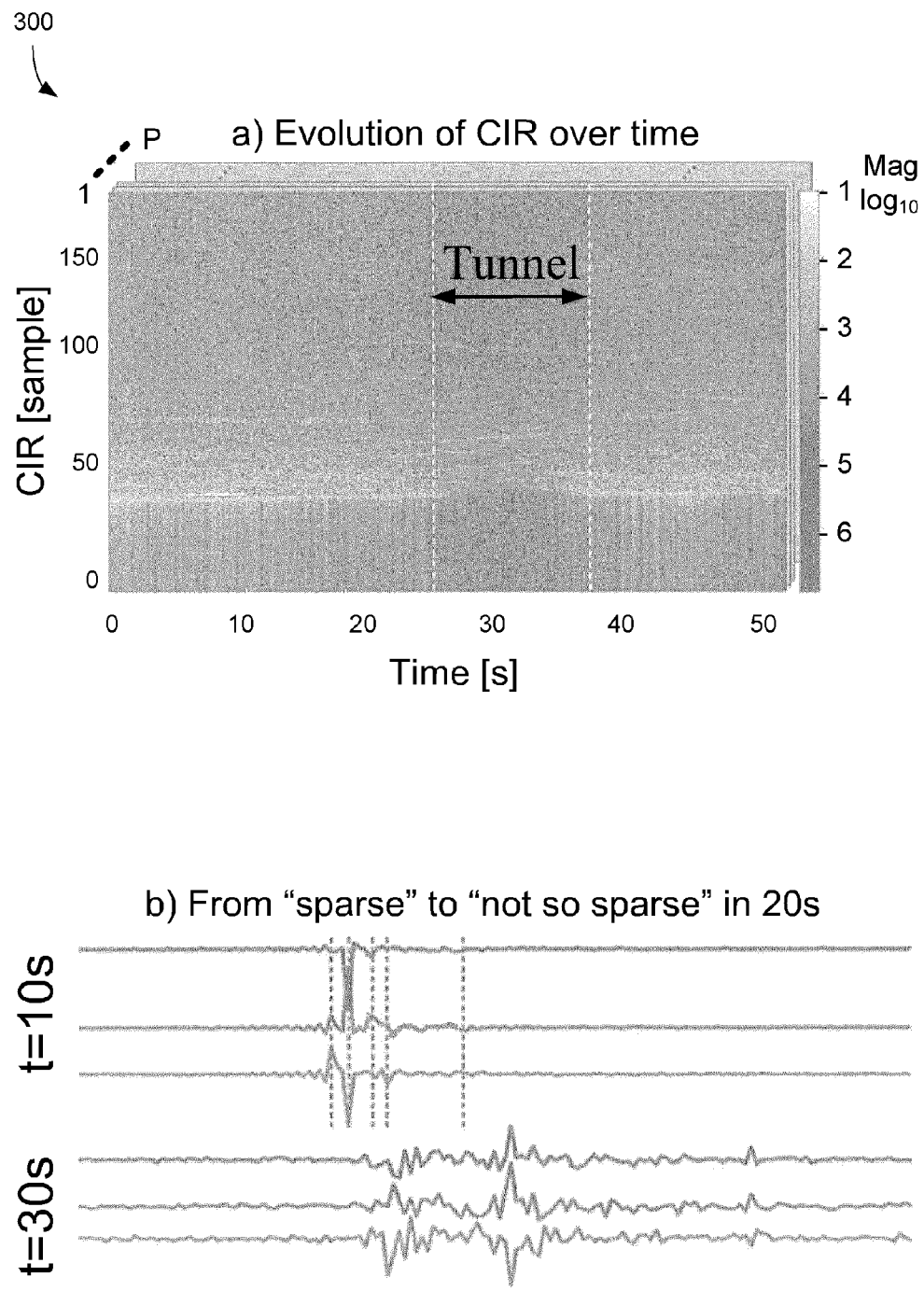
FIG. 3a show a channel impulse response for a channel between a mobile phone and an antenna at a receiver, wherein the mobile phone passes through a tunnel between time t=25 and t=35.
FIG. 3b shows three channel impulse responses of three channels between the mobile phone and three antennas at the receiver, at times t=10 and t=30.

FIG. 3b shows three channel impulse responses (CIR) measured in the field measurements at a receiver which has three antennas; each of the channel impulse responses are defined by reflections (represented by peaks in the CIR) of the transmitted impulse signal from a scatterer. A transmitter, in the form of a mobile phone, generates the impulse signal which are sent along each of the three channels to each antenna.

FIG. 3a shows the CIR of one of the three channels. Between time 25 s-35 s the mobile phone enters a tunnel. Once the transmitter enters the tunnel the tunnel generates a large amount of reflections (the walls of the tunnel define a large number of scatterers which reflect the transmitted impulse response).

FIG. 3b shows the number of reflections (represented by peaks in the CIR) of the transmitted impulse signal which are received at each of the three antennas of the receiver. At time t=10 s the mobile phone is outside of the tunnel and a low number of reflections (indicated by peaks in the CIR) are received at each of the three antennas of the receiver; thus, the channels are considered to be sparse. At time t=30 s mobile phone enters the tunnel and the number of reflections (indicated by peaks in the CIR) of the transmitted impulse signal which are received at each of the three antennas of the receiver increases so that the channels are now considered non-sparse. At time t=30 s the impulse signal is reflected by the walls of tunnel thus causing a dramatic increase in the number of reflections received at each of the three antennas of the receiver. Compared to the reflections which are received at the receiver at time t=10 s, the reflections received at each of the three antennas of the receiver at time t=30 s have a lower amplitude as the reflections received at each of the three antennas of the receiver at time t=10 s; this is indicated by the peaks in the CIR at time t=30 s having a lower amplitude than the peaks in the CIR at time t=10 s; this indicates that the scatterers, which in this case are the walls of the tunnel, also attenuate the impulse signal when they reflect the impulse signal.

Thus, when the mobile phone enters the tunnel the channels change from being sparse to being non-sparse. Since the SCS-FRI algorithm assumes that the channel is sparse; when the mobile phone enters the tunnel too many reflections are generated to enable the SCS-FRI algorithm to be effective in estimating the CIR's of the three channels.

So if an estimation algorithm, which is suitable for estimating sparse channels, were used to estimate the three channels, it would be not be suitable for estimating the channels when the mobile phone is inside the tunnel; however if an estimation algorithm which is suitable for estimating band-limited (non-sparse) were used to estimate the three channels, it would be not be suitable for estimating the channels when the mobile phone is outside the tunnel.

The present description defines what is required for a sparse common support (SCS) channel for aerial electromagnetic (EM) transmissions. It will then be shown that the channel used for aerial electromagnetic (EM) transmissions may not always be sparse in practice; thus establishing the requirement for a robust SCS channel estimation algorithm which is capable of determining the sparsity conditions of a channel i.e. to determine if the channel is sparse or not. A review of the application of an SCS-FRI algorithm used to estimate the CIR of a SCS channel, will be provided.

Finally, an algorithm/method of the present invention will be described, in which it is first determined if a channel is sparse, and then estimation of the channel's impulse response is carried out using a non-sparse technique or a sparse technique, depending on whether the channel was determined to be sparse or not.

Sparse Common Support (SCS) Channel Model

In one embodiment, algorithms for the estimation of channel impulse response (CIR) of a sparse common support channel, from noisy measurements are determined. It is desired that algorithms which are used to estimate the CIR of a channel, be computationally simplistic, so as to minimize processing power.

Details on the use of an SCS-FRI algorithm to estimate a CIR of a sparse common support channel may be found in the publication "*Estimation of sparse MIMO channels with common support* IEE Trans. Commun.*, 2012, of Y. Barbotin, A Hormati, S Rangan, and M Vetterli. The algorithm is suitable for estimating a sparse channel; however in practice a channel may not always be sparse (as discussed, for example, with reference to FIGS. 3a and 3b).

For example, indoor electromagnetic (EM) channels are, in general, not sparse, details of which are provided in the publication "A. Saleh and R. Valenzuela, "*A statistical model for indoor multipath propagation," IEEE J. Sel. Areas Commun.*, vol. 5, no. 2, pp. 128-137, February 1987". In this publication, reflections of an impulse signal sent across the channel from a transmitter to a receiver are bundled in clusters; and each of the clusters have an exponentially decaying energy. After demodulation, the CIR (h(t)) of the channel can be described as the superposition of clustered reflections ($C_k$) as follows:

$$h(t) = \sum_{k=1}^{K} \sum_{(A_l, \Delta_l) \in C_k} c_l \varphi(t - t_k - \Delta_l), \quad (1)$$

$$\overset{\mathcal{F}}{\leftrightarrow} \sum_{k=1}^{K} e^{-j\omega t_k} \sum_{(A_l, \Delta_l) \in C_k} A_l e^{-j\omega \Delta_l} \hat{\varphi}(e^{j\omega}),$$

wherein $\varphi$ is the transmitted impulse signal which is sent along the channel and which has a bandwidth limited to the channel bandwidth; K are the number of clusters in the time domain (after demodulation), and $C_k$ are the clusters of reflections which have a reference time $t_k$; within each cluster there exits reflections shifted by time $\Delta_l$ from the reference time $t_k$, which each have randomly distributed complex-valued amplitudes $A_l$.

The number of clusters K is usually at least one order of magnitude smaller than the Nyquist rate of the channel, but the total number of reflections in all clusters is preferably larger than the Nyquist rate of the channel.

However, if the bandwidth $\Omega_\Omega$ of the channel and the maximum time $\Delta_l$ are small enough, the zeroth-order approximation is:

$$e^{j\omega \Delta_l} \hat{\varphi}(e^{j\omega}) \approx \hat{\varphi}(e^{j\omega}),$$

and holds for at all considered frequencies $\omega \in ]-\pi, \pi$.

If in addition the complex-valued amplitudes $A_l$ are pairwise independently identically distributed (iid), the known central-limit theorem of statistics may be used to obtain a channel impulse response of the channel known as the "multipath Rayleigh channel model" which is:

$$h(t) = \sum_{k=1}^{K} C_k \varphi(t - t_k), \quad C_k \sim \mathcal{N}_C(0, c_k^2 \mathbb{I}). \quad (2)$$

Wherein h(t) is the channel's impulse response, $\varphi$ is the transmitted impulse signal, $C_k$ are the amplitudes of reflections, and K are the number of clusters.

The channel is 'sparse' if and only if the expected delay spread $\tau = t_K - t_1$, i.e. the time between the first and last time of arrival of the impulse signal components at the receiver, verifies:

$$K/\tau << \Omega_\phi / 2\pi,$$

i.e., if the rate of innovation is substantially lower than the Nyquist rate of the channel. The requirements for sparsity are thus two-fold; the "girth" (time spread) of each cluster must be a fraction of the inverse bandwidth of the channel; and the density of clusters must be a fraction of the channel bandwidth. The first requirement indicates that for a channel to be sparse the channel should have a low or medium bandwidth $\Omega_\phi$ (for example, less than 200 MHz), while the second requirement indicates that for a channel to be sparse, long-distance propagation (for example, more than 100 m) between transmitter and receiver is required to increase the delay spread $\tau$; as is the case for certain outdoor communications for example.

The high propagation velocity of the impulse signal along the channel ensures scatterers of large dimensions, such as trees, generate clusters of modest delay spread $\tau$, allowing the use of the equation (2), instead of equation (1), for the estimation of the channel impulse responses of channels which have a bandwidth up to 100 MHz approximately.

When a receiver (Rx) comprises several antennas (as is the case in SIMO (single-input-multi-output) and MIMO (multi-input-multi-output) communications) several channels will exist (between a transmitter Tx and each of the several antennas of the receiver Rx) and the receiver Rx will thus observe several impulse responses when an impulse signal is transmitted by the transmitter.

Considering one transmitter transmitting an impulse signal to P receiving antennas (i.e. 1-to-P) across P different channels; the receiver observes the impulse responses of each of the P different channels; P impulse responses will therefore be observed by the receiver, wherein the P impulse response are given as:

$$h_p(t) = \sum_{k=1}^{K} C_{k,p} \varphi(t - t_{k,p}), \, p = 1, \ldots, P,$$

wherein $h_p(t)$ is the impulse response of a channel 'p', P is the number of channels (and the number of receiving antennas), K is the number of components in the impulse response, wherein a component of the impulse response is a reflection from a scatterer (therefore K is also the number of scatterers), $C_{k,p}$ is the amplitude of the reflection (which may be a complex value) and $\varphi$ is a channel mask, and t is a reference time, wherein $t_{k,p}$ is the time of arrival of the impulse at the receiver.

For each channel there are K unknown components in the impulse response, since there are P channels, there is therefore a total of K*P unknown components. Each component has three coefficients; a real and imaginary value which represent the amplitude of a reflection from a scatterer, and a time of arrival value which is the time at which the reflection is received at receiver (Rx); thus, providing a total of 3 KP unknown coefficients. The coefficients of an impulse response of a channel define said channel.

If the distance between the P receiving antennas in a receiver (Rx) is comparatively small relative to the propagation velocity of the impulse signal which is transmitted, then for the same scatterer, the difference in the time of arrival at each of the P receiving antennas, of components of the P impulse responses which have resulted from the same scatterer, will be negligible. For example, if $d_{max}$ is the maximal distance between two of the P receiving antennas, the maximum difference between the time of arrivals of components of an impulse response at each of the antennas will be $2d_{max}/c$, wherein c is the speed of light. If $d_{max}$ is in the order of centimeters then the difference in time of arrivals is in the order of nano-seconds. Therefore, the times of arrival, at each of the P receiving antennas, of the component resulting from the same scatterer, are approximately equal (resulting in equation (3) below). However, the amplitudes of the components arriving at each of the P receiving antennas still differ as the amplitudes are not statistically correlated (resulting in equation (4) below). Therefore providing:

$$t_{k,1} \approx t_{k,2} \approx \ldots \approx t_{k,P}, \quad (3)$$

$$C_{k,1} \neq C_{k,2} \neq \ldots \neq C_{k,P}. \quad (4)$$

Wherein delay $t_{k,1}$ is a time delay in the $k^{th}$ component of the impulse response of the first channel, $t_{k,2}$ is a time delay in the $k^{th}$ component of the impulse response of the second channel etc. and $C_{k,1}$ is the amplitude of the $k^{th}$ component of the impulse response of the first channel, $C_{k,2}$ is the amplitude of the $k^{th}$ component of the impulse response of the second channel etc. When the time of arrival, at each of the P receiving antennas, of components of different channel impulse responses which have resulted from the same scatterer, are approximately equal, then the channels have common support. Therefore the criterion for common support is:

$$d_{max} \ll \pi \frac{c}{\Omega_\varphi}.$$

Wherein $\Omega_\varphi$ is the bandwidth of a channel. Therefore, for channels to have common support which is stable over time depends only on the distance between receiving antenna's.

For channels to be sparse depends on the number of scatterers. The number of scatterers may change (as was discussed with reference to FIG. 2), therefore a channel may change from a sparse condition to non sparse condition and vice versa. For a channel to be sparse a low number of scatterers should be present along the channel. Specifically, the number of scatterers present along the channel should be less than the Nyquist rate of the channel. Hence, outdoor communication channels, with medium bandwidth typically are sparse channels because there are usually a low number of scatterers.

Estimation of Sparse Common Support Channels from DFT Pilots

Assuming a transmitter (Tx) in a communication system transmits a continuous-time pilot signal which has a period of $\tau_f$, to a receiver (Rx), across SCS channel. Uniform and critical sampling of the pilot signal, at the receiver (Rx) will yield, in the time domain:

$$x_p[n] = x_p(n\tau_f/N_f), n=0, \ldots, N_f-1.$$

Wherein $x_p[n]$ is a sequences of uniform samples of the continuous-time pilot signal $x_p(\ )$ received at the receiver (Rx), $N_f$ is the number of samples when the pilot signal is sampled at the Nyquist rate.

The $N_f$ samples form a vector $x_p$:

$$x_p = [x_p[0] \ldots x_p[N_f-1]]^T$$

The discrete Fourier transform of $x_p$ may be obtained to form a vector $\hat{X}_p$ with $N_f$ frequency coefficients:

$$\hat{X}_p = W x_p$$

wherein W is the Discrete Fourier Transform matrix.

FIGS. 1a-c show different possible layouts for different transmitted the pilot signals. FIG. 1a shows a layout in which the frequency coefficients (12) of the pilot signal are non-zero (13) (black spots) along the whole bandwidth (14) of the channel for every third time period (t1-t10) of pilot signal; FIG. 1b shows a layout in which the frequency coefficients (12) of the pilot signal are periodically non-zero (13) over the whole bandwidth (14) of the channel for each successive time period (t1-t10) of the pilot signal. FIG. 1c shows a layout in which the frequency coefficients (12) of the pilot signal are periodically non-zero (13) over the whole bandwidth (14) of the channel and the non-zero frequency coefficients (13) are shifted between consecutive periods (t1-t10) of the pilot signal. It is important that the location of non-zero frequency coefficients (13) of the pilot signals form a regular periodic pattern; this is the case for all of the pilot signals illustrated in FIGS. 1a-c. The pilot signals illustrated in FIGS. 1a-c are examples of the pilot signals which may be used in the present invention. It should be noted that in FIGS. 1a-c the on-zero frequency coefficients (13) are represented as black dots while zero frequency coefficients (15) are represented as white dots.

D-1 is the number of zero frequency coefficients (15) between non-zero frequency coefficients (13) in a period of a pilot signal. For example in FIG. 1b, D=3 as the number zero frequency coefficients (15) between consecutive frequency coefficients in a period of the pilot signal is 2 (i.e. 3-1). The variable 'D' is referred to in the art as the 'decimation factor'.

The pilot signals may be used estimate the CIR of the SCS channel to be estimated.

It may be assumed, without loss of generality, that $N_f = 2MD+1$, wherein $N_f$ is the number of samples of the pilot signal, D is the decimation factor and $2M+1$ is the number of non-zero frequency coefficients of the pilot signal, per period. Preferably the non-zero frequencies coefficients of the pilot signal have the value of '1'. The total number of non-zero pilots (N) is given by $N=2M+1$.

The transmitted pilot signal is periodically padded to ensure a convolution with the CIR of the SCS channel is circular. Assuming the non-zero frequencies coefficients of the pilot signal have the value of '1', then:

$$\hat{x}_p = \text{diag}(1_P) \hat{h}_p,$$

$$\Leftrightarrow \hat{x}_p = W \text{diag}(1_P) W^H h_p,$$

Wherein $\hat{X}_p$ is the Discrete Fourier Transform of the vector $x_p$, which is the vector containing $N_f$ samples of the continuous-time pilot signal $x_p(\ )$ received at the receiver (Rx), W is the Discrete Fourier Transform matrix, P is a vector containing the locations of the non-zero frequency coefficients of the transmitted pilot signal, wherein $\hat{h}_p$ is the Fourier transform of the impulse response of channel is given by:

$$\hat{h}_p[n] = \sum_{k=1}^{K} C_{k,p} W_{N_f}^{n t_k / \tau_s}. \quad (5)$$

The operator $W \text{diag}(1\rho) W^H$ is an orthogonal projection in the subspace spanned by the column vectors of the Discrete Fourier Transform matrix, corresponding to the locations of the non-zero frequency coefficients of the transmitted pilot signal.

If the synchronization between a transmitter and receiver is such that the time of arrival of impulse signal are contained in the time period $[-\tau/2, \tau/2]$, wherein $\tau$ is the delay spread of the channels, then the decimation factor (D) should be chosen such that it satisfies:

$$D \leq \left\lfloor \frac{T_s}{\tau} \right\rfloor, D \in \mathbb{N}, \quad (6)$$

wherein $T_s$ is the period of the transmitted pilot signal and $T$ is the delay spread of the channels. The Fourier Transform of the impulse response of the channel may be received using the $$W^H h_p = C_D \mathrm{diag}(1_P) W^H x_p, \quad (7)$$

following equation:
Wherein $C_D$ is:

$$[C_D]_{m,n} = \frac{\sin(\pi(m-n)/D)}{\sin(\pi(m-n)/N_j)},$$

Wherein is the line index and 'n' is the column index in the matrix $C_D$.

The matrix $C_D$ can be used to perform lowpass interpolation of $\mathrm{diag}(1_P) W^H x_p$, which corresponds to a rectangular windowing of the vector $x_p$ in time. Rectangular windowing cancels any noise outside the time range $[-\tau/2, \tau/2]$.

FRI Approach

Using the values obtained from the estimation of sparse common support channels from DFT pilots, the FRI algorithm may be used to estimate the unknown parameters of the channel impulse response.

The FRI approach involves firstly retrieving the times arrival of the channel impulse responses at the receiver, and then for each channel, estimating the amplitudes of the components of the channel impulse responses.

FRI algorithms and analysis for SCS channel impulse response estimation are described in publication identified by (Y. Barbotin, A. Hormati, S. Rangan, and M. Vetterli, "Estimation of sparseMIMOchannels with common support," IEEE Trans. Commun., 2012, submitted for publication), and are an extension of linear techniques such as ESPRIT or the annihilating filter used to estimate the impulse response of common-support channels.

To obtain the times arrival of the channel impulse responses at the receiver the following data matrix, of dimensions $(M+1) \times (M+1)$, is formed for each of the P channels:

$$T_p = \begin{bmatrix} \hat{h}_p[0] & \hat{h}_p[-D] & \hat{h}_p[-2D] & \ldots \\ \hat{h}_p[D] & \hat{h}_p[0] & \hat{h}_p[-D] & \ldots \\ \hat{h}_p[2D] & \hat{h}_p[D] & \hat{h}_p[0] & \ldots \\ \vdots & \vdots & \vdots & \ddots \end{bmatrix}, =$$

$$\mathrm{toeplitz}(\ldots, \hat{h}_p[-2D], \hat{h}_p[-D], \hat{h}_p[0], \hat{h}_p[D], \hat{h}_p[2D], \ldots).$$

The data matrices have the following Vandermonde decomposition:

$$T_p = J\mathcal{V} \mathrm{diag}(C_{p,1}, \ldots, C_{p,K}) \mathcal{V}^H,$$

$$\text{such that } \mathcal{V} = \begin{bmatrix} 1 & \ldots & 1 \\ W^{Dt_1/\tau_0} & \ldots & W^{Dt_K/\tau_0} \\ W^{2Dt_1/\tau_s} & \ldots & W^{2Dt_K/\tau_s} \\ \vdots & \vdots & \vdots \end{bmatrix},$$

Wherein J is the exchange matrix, and W is $e^{-pi ej}$, and wherein the matrix u is a vandermonde matrix as defined in the formula above.

Using u matrix the following matrices may be built:

$$V^{\uparrow} \overset{def}{=} [V]_{1:(M-1),:} \text{ and } V^{\downarrow} \overset{def}{=} [V]_{2:M,:},$$

These matrices verify a rotation invariance property:

$$V^{\uparrow} = V^{\downarrow}\Psi, \Psi = \mathrm{diag}(W^{Dt_1/\tau_s}, \ldots, W^{Dt_K/\tau_s}).$$

Any matrix V having the same column space as the matrix $\rho$ can be written as $V = \rho A$ where A $$V^{\uparrow} = V^{\uparrow} A,$$
$$= V^{\downarrow} \Psi A,$$
$$= \underbrace{V^{\downarrow} A}_{v^{\downarrow}} \underbrace{A^{-1} \Psi A}_{x}.$$

is a full-rank $K \times K$ matrix (wherein K is the number of components of the impulse response which are to be identified), therefore:

The time of arrival is recovered from any matrix V which is a basis of the column-space of $T_P$ (i.e. a matrix which spans the column space of $T_P$) as the phase of eigenvalues of X, wherein X is obtained from the equation:

$$V^{\uparrow} = V^{\downarrow} X,$$

which is the ESPRIT algorithm.

The time of arrival of the impulse responses at the receiver are the same, therefore the ESPRIT algorithm may be applied to the following matrix:

$$T = \begin{bmatrix} T_1 \\ \vdots \\ T_P \end{bmatrix}, \quad (8)$$

The application of the ESPRIT algorithm to the matrix T is referred to in the art as SCS-FRI-ESPRIT.

In the presence of added white Gaussian noise (AWGN), the matrix V may be obtained from the singular value decomposition (SVD) of the matrix T, by extracting the K principal singular vectors from the matrix T wherein K is the number of the components of the impulse response which is to be estimated Principal singular vectors are those vectors which are associated with the largest singular values.

The case when the number of components K of the impulse responses of P channels and the number of receiving antennas P, are small compared to the number of non-zero pilot frequency coefficients (N), will now be considered.

The finite rate of innovation (FRI) sampling for channel estimation outlined above has two shortcomings if implemented in a straight forward manner. The first is its computational complexity and memory footprint are respectively $O(N^3)$ and $O(N^2)$. Both are contributed by the SVD decomposition used to estimate the column-space of matrix T. The second shortcoming is that the number of signal components K is unknown.

The computational complexity is especially important for channel estimation as it is a core signal processing block at the receiver's physical layer. It is called on several times per second, and must operate in real-time with limited power and hardware resources.

An O(KPN log N) FRI Estimation

Computation of matrix V from the singular value decomposition (SVD) of the matrix T in equation (8) is wasteful for two reasons: Firstly, only K out of M+1 principal singular vectors are of interest. Secondly, matrix T is well structured because it is composed of Toeplitz blocks, and matrix factorization techniques used to compute the SVD of matrix T, such as QR factorization (factorization as a product of unitary and triangular matrices), will destroy this structure of matrix T, during the factorization process, rendering the structure of matrix T unexploitable and requiring an explicit storage of the data matrix.

As the column-space of the matrix T is of interest, one could also derive matrix V from the hermitian symmetric correlation matrix, $$T^H T = \sum_{p=1}^{P} T_p^H T_p,$$

A solution to compute only the leading eigenpairs of $T^H T$, is to project the matrix $T^H T$, in a Krylov subspace (as thought in B. N. *Parlett, The Symmetric Eigenvalue Problem*. Englewood Cliffs, N.J.: Prentice Hall, 1998). This is an iterative method in which computations are performed on the original $T^H T$ matrix, meaning the original structure of block-Toeplitz structure of T is preserved. Since the Toeplitz-blocks of T can be represented by their first row and column, the memory footprint is kept low and the computational complexity is similar for each iteration.

Projection of a matrix in a Krylov subspace may be used. Projection into a Krylov subspace is done with Lanczos tridiagonalization algorithm (as in Ch. 9, *Matrix Computations*, G. H. Golub, C. F. Van Loan, Johns Hopkins University Press, 1989).

The additional structure on the original data matrix T allows to lower the complexity from $O(N^2)$ to (N log N), making projection into a Krylov subspace useful for matrixes of even a modest size. Criterion required to estimate the signal subspace dimension K which requires $O(K^2)$ computations to be run along the Lanczos tridiagonalization process will be derived.

A K-dimensional Krylov subspace K of a M-dimensional hermitian matrix A is:

Where f is an initial vector which can be randomly chosen:

$\kappa_{K,f}(A) = \text{span}_{k=1,\ldots,K} A^k f,$ $F_K = [A^k f]_{k=1,\ldots,K},$ the $k^{th}$ basis vector $A^k f$ is a monomial of A of degree k, therefore, using a three terms linear recursion on the sequence of monomials $\{A^k f\}_{k=1,\ldots}$ one can derive a sequence of orthogonal polynomials using known methods in the art (G. Szego, Orthogonal Polynomials. Providence, R.I.: AMS, 1939). This is equivalent to an orthonormal matrix $Q_K$ of $\kappa_{K,f}(A)$ and is computed by orthogonalization of each of $A^k f$ monomials against the two previous monomials $A^{k-1} f$ and $A^{k-2} f$ and normalization. So, the main computational cost of the Lanczos tridiagonalization is the computation of the non-orthogonal basis vectors, which is done by recursive matrix-vector multiplications.

The three terms recursion used to orthogonalize the Krylov basis implies that $K_{K,f}(A)$ has a tridiagonal decomposition:

$P_{f,K} A = Q_K^H \Gamma_K Q_K.$

Where $Q_K$ is unitary and $\Gamma_K$ is symmetric and tridiagonal (due to the three-term recursion). The eigenpairs of $P_{f,K} A$ are derived from this factorization at little cost, and they are called the Ritz pairs.

The Ritz pairs quickly converge to the principal eigenpairs of A as K grows. This quick rate of convergence of the Ritz pairs is due to the link between the rate of convergence of the Ritz pairs, with the growth rate of Chebyshev polynomials. Ritz pairs converge faster to the corresponding eigenpairs if the eigenvalues are farther apart.

Because of the Toeplitz structure of the data matrix T, matrix vector multiplications with $T^H T$, which is the central step of a Lanczos iteration, has a computational cost of O(PN log(N)). Indeed, $$T^H T f = \sum_{p=1}^{P} T_p^H T_p f$$

is the sum of P matrix-vector multiplications, each of them realized as two consecutive Toeplitz matrix-vector multiplications. Square Toeplitz matrixes of dimension M+1 can be embedded in circulant matrices of dimension 2(M+1)=N+1 as follows:

Circulant matrices are diagonalized by the discrete fourier transform matrix (W), hence $$C_p \stackrel{def}{=} \begin{bmatrix} T_p & \overline{T}_p \\ \overline{T}_p & T_p \end{bmatrix},$$

$T_p = toeplitz(t_{p,-M}, \ldots, t_{p,0}, \ldots, t_{p,M}),$ $\overline{T}_p = toeplitz(t_{p,1}, \ldots, t_{p,M}, 0, t_{p,-M}, \ldots, t_{p,-1}).$ the cost of a circulant matrix-vector multiplication is dominated by the computational cost of four Fast Fourier Transforms (FFT).

Since each Lanczos iteration has a computational cost dominated by 4P Fast Fourier $$[\mathbb{1}_M \ O_M] C_p^H \begin{bmatrix} \mathbb{1}_M & O_M \\ O_M & O_M \end{bmatrix} C_p \begin{bmatrix} f \\ 0 \end{bmatrix} = T_p^H T_p f,$$

Transforms each of length N+1, therefore the total computational cost of the Lanczos iteration is O(PN log(N)). It should be noted that the Discrete Fourier Transform of the matrix Cp can be pre-computed.

Online Sparsity Assessment

In this section a partial effective rank (PER) is introduced, which is a criterion to estimate the number of unknown components in the channel impulse response, working online (i.e. as the algorithm is running) with the Lanczos algorithm. The main advantage of the PER compared to other methods to estimate the number of components in an impulse response of a channel is that the PER requires only the knowledge of only some of the leading eigenvalues of the matrix $T^H T$.

Traditional Information Criterions have a number of shortcomings. Information theoretic criteria such as Rissanen's MDL, or Akaike criterion are tools which may be used to evaluate the number of signal components of a channel. They all follow a similar pattern, which is to minimize:

Where $\mathcal{L}$ is the log-likelihood function based on σ the singular values of matrix T, and K is an $ITC(\sigma, K) = \mathcal{L}(\sigma, K) + K \cdot (2(M+1) - K) \cdot P(M)$ estimate of the sparsity level of the channel. The term P is a penalty growing at rate between K is an estimate of the sparsity level of the channel. The term P is a penalty growing at rate between O(1) and o(N). The evaluation of the log-likelihood function requires to compute the product:

$$\prod_{m=K}^{M} \sigma_m^2 = \det(T^H T) \Big/ \prod_{k=0}^{K-1} \sigma_k^2$$

which has an algorithmic cost superior to the Lanczos algorithm itself.

Let A be a matrix with singular values $\sigma = [\sigma_1, \ldots, \sigma_M]^T$ in decreasing order, and singular values distribution For example, matrix T mentioned above has each of these characteristics.

$p_m = \sigma_m / \|\sigma\|_1, m=1, \ldots, M.$

The effective rank of matrix A is:

$\mathrm{erank}(A) = e^{\mathcal{H}(p_1, \ldots, p_M)},$

Wherein $\mathcal{H}$ is the entropy of three singular values distribution, $$\mathcal{H}(p_1, \ldots, p_M) = -\sum_{m=1}^{M} p_m \log_e p_m.$$

For A and $\mathcal{H}$ and $p_{K,k} = \sigma_k / \|\sigma_{1:K}\|_1, k=1, \ldots, K \leq M,$ the PER is, $\mathrm{PER}_K(A) = e^{\mathcal{H}(p_{K,1}, \ldots, p_{K,K})}.$ The PER has the following properties:

$0 \leq \mathrm{PER}_{K+1}(A) - \mathrm{PER}_K(A) \leq 1,$

The lower bound "0" is reached if and only if $\sigma_{K+1} = 0$ and the upper bound 1 is reached if and only if $\sigma_1 = \sigma_2 = \ldots = \sigma_{K+1}.$ The increase of the PER, with the estimated number of signal components K, reflects the significance of the $K^{th}$ principal component of A compared to previous principle components. The number K for which PER(K+1)−PER(K) is minimal is then the estimate of the number of signal components. To avoid $$PER(K+1) - PER(K) \geq \frac{1}{L} \sum_{l=1}^{L} (PER(K+1+l) - PER(K+l))$$

computing the PER up to PER(N), a simple local minimum detection on PER(K+1)−PER(K) may be used, such as where L is an integer number greater than 0. For example, L=4 is a possible choice. The estimated number of signal components is then the smallest positive integer K for which the above inequality is verified.

Advantageously, the SCS property helps in lowering the symbol error rate (SER) at medium to low SNR (below 0 dB). Also the "sparsity" model assumed by FRI (few reflections) match the field measurements better than the model assumed by CS (few nonzero coefficients). Preferably any algorithm exploiting sparsity will be "introspective" i.e., it must detect when sparsity does not occur, and fallback to a more traditional method whenever it happens. It is exemplified by the stroll through the tunnel.

Figure 4:
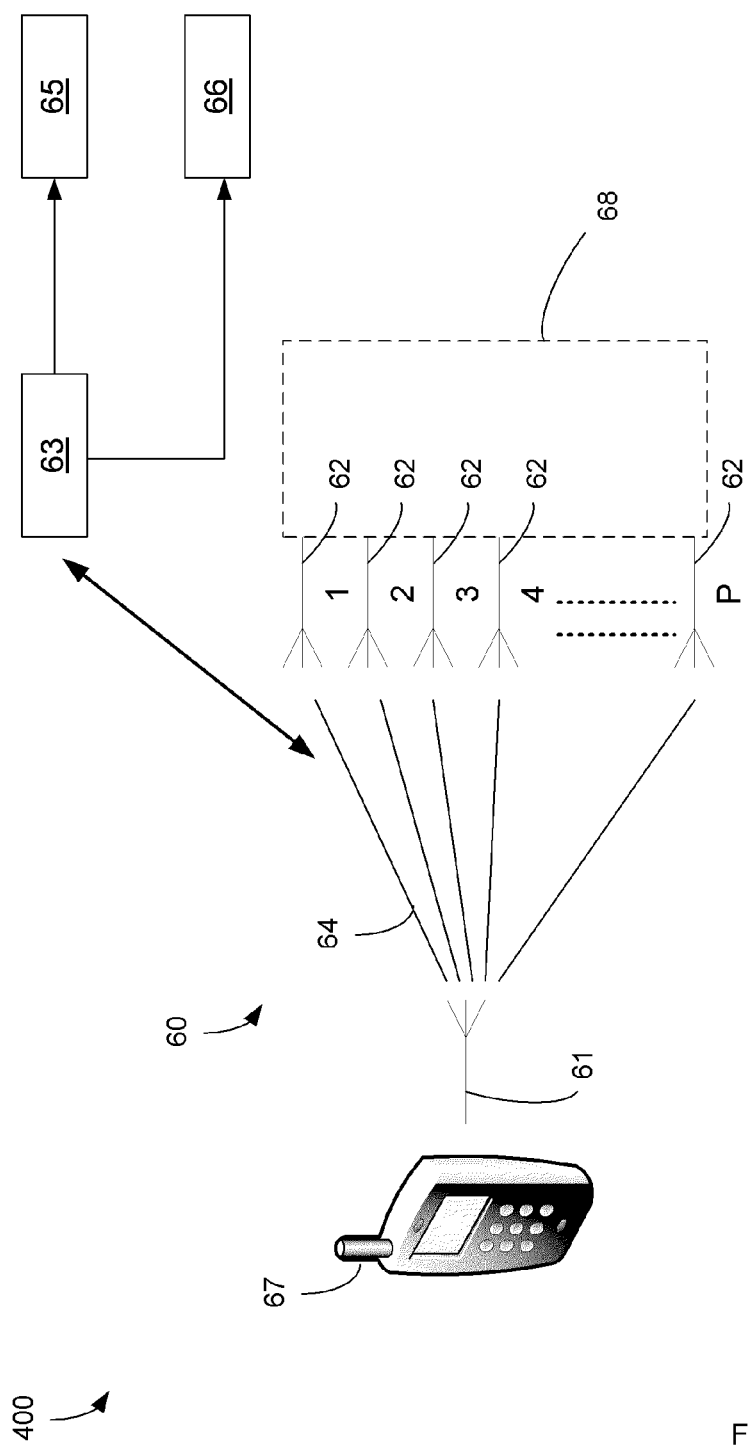
FIG. 4 provides a schematic of an apparatus according to an embodiment of the present invention.

Referring now to FIG. 4; FIG. 4 provides a schematic of an apparatus 60 for estimating multipath jointly sparse channels, according to an embodiment of the present invention. The apparatus 60 comprise, a transmitting antenna 61 for transmitting a signal; a number P of receiving antennas 62, where P≥2, for receiving a number K of signal components; a first module 63 for estimating the sparsity condition of the multipath jointly sparse channels 64; a second module 65 for estimating the impulse responses of the channels 64 by using a non-sparse technique if the sparsity condition is not satisfied; and a third module 66 estimating the impulse responses of the channels 64 using a sparse technique if the sparsity condition is satisfied. It should be noted that the first module 63 operates simultaneously with the second or third module 65, 66 so that the sparsity condition of the channels and the impulse responses of the channels are simultaneously determined.

In this particular example the transmitting antenna 61 is a single antenna 61 belonging to a mobile device, such as a mobile phone 67 and the receiving antennas 62 belong to a base station 68.

The systems and methods of estimation of jointly sparse channels described above can be embodied, for example, in a wireless modem or wireless device integrating such a modem.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the methods, systems, and apparatuses disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Moreover, embodiments disclosed herein may be implemented or performed with an electronic device or circuit such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Various embodiments of the invention have been described. These and other embodiments are within the scope of the following claims.

What is claimed is:

1. A method for estimating multipath jointly sparse channels comprising:
    receiving a number K of signal components by a number P of receiving antennas, where $P \geq 2$;
    estimating the sparsity condition of the multipath jointly sparse channels;
    if the sparsity condition is not satisfied, estimating the channels by using a non-sparse technique; and
    if the sparsity condition is satisfied, estimating the channels by using a sparse technique,
    said estimating the sparsity condition comprising using Partial Effective Rank techniques for deriving estimates of K.

2. The method of claim 1, said using Partial Effective Rank techniques comprising
    calculating K singular values by using singular value decomposition of a matrix representing the received signal components;
    calculating the sequence of the partial effective ranks of said matrix; and
    based on said sequence, determining the rank K.

3. The method of claim 2, said sequence of the partial effective ranks comprising the first singular value; the first, the second singular values; the first, the second and the third singular values; . . . ; the first, the second, the third, . . . , the (K−1)th singular values; the first, the second, the third, . . . , the (K−1)th, the Kth singular values.

4. A method for estimating multipath jointly sparse channels comprising:
    receiving a number K of signal components by a number P of receiving antennas, where $P \geq 2$;
    sampling each signal component and obtaining a number N of sampled measurements per jointly sparse channel;
    estimating the sparsity condition of the multipath jointly sparse channels;
    if the sparsity condition is not satisfied, estimating the channels by using a non-sparse technique; and
    if the sparsity condition is satisfied, estimating the channels by using a sparse technique.

5. The method of claim 4, K being the number of scatterers between a transmitting antenna and the receiving antennas.

6. The method of claim 4, said sampling being a uniformly sampling.

7. The method of claim 6, said sampling comprising using finite rate of innovation techniques.

8. The method of claim 7, said estimating the sparsity condition comprising comparing the rate of innovation and the Nyquist rate.

9. The method of claim 8, the sparsity condition being satisfied if $K/\tau \ll \Omega_\phi/2\pi$ where $\tau$ is the delay-spread and $\Omega_\phi/2\pi$ is the Nyquist rate.

10. The method of claim 4, comprising considering clusters bundling reflections of the transmitted signal.

11. The method of claim 10, the estimating the sparsity condition comprising:
    measuring the girth of each cluster and comparing it with the inverse bandwidth $\Omega_\phi$ of the channel; and
    measuring the density of the clusters and comparing it with the bandwidth $\Omega_\phi$ of the channel.

12. The method of claim 4, said multipath jointly sparse channels sharing a common structure.

13. The method of claim 12, said multipath jointly sparse channels being Sparse Common Support Channels.

14. The method of claim 13, comprising determining a number of unknowns, said number being (2P+1)K.

15. The method of claim 13, comprising the estimation of said Sparse Common Support Channels from DFT-domain measurements of pilots.

16. The method of claim 13, comprising the application of finite rate of innovation and discrete sparse representation to Sparse Common Support Channels estimation.

17. The method of claim 13, comprising the verifying of the criterion of common support.

18. The method of claim 17, said criterion of common support being $$d_{max} \ll \pi \frac{c}{\Omega_\varphi},$$

where $d_{max}$ is the maximal distance between two antennas and $\Omega_\phi$ the bandwidth of the channel.

19. The method of claim 18, comprising designing the receiving antennas topology so as to verify the common support criterion.

20. The method of claim 13, comprising the estimation of said Sparse Common Support Channels from a subset of its DFT coefficients.

21. The method of claim 20, said subset of DFT coefficients comprising an integer number D of DFT coefficients, where $$D \leq \left\lfloor \frac{\tau_s}{\tau} \right\rfloor,$$

where $\tau_s$ is the period of a pilot and $\tau$ is the delay-spread.

22. The method of claim 21, said using a sparse technique comprising equalization by the pilot sequence and the orthogonal projection in the subspace of phasors of frequency $<\tau_s/2\tau$.

23. The method of claim 22, further comprising low-pass interpolation of the channel spectrum for obtaining missing decimated samples.

24. The method of claim 13, said using a sparse technique comprising identifying the common support of jointly K subspaces.

25. The method of claim 24, further comprising using Vandermonde decomposition.

26. The method of claim 24, further comprising computing the orthogonal projection of the measurements in the union of K subspaces separately for each channel.

27. The method of claim 24, further comprising using array-processing techniques.

28. The method of claim 27, said array-processing techniques comprise ESPRIT and/or annihilating filtering.

29. The method of claim 13, said using sparse technique comprising using the limited length of the delay spread, the sparsity and the common support.

30. The method of claim 13, said using sparse technique comprising using sparsity as a regularization technique for making the estimation robust to noise.

31. The method of claim 4, comprising considering K<<N and P<<N.

32. The method of claim 4, comprising an O(KPN log(N)) finite rate of innovation estimation.

33. The method of claim 32, said estimation comprising projecting a Hermitian symmetric correlation matrix in a Krylov subspace.

34. The method of claim 33, said using sparse technique comprising using Krylov subspace projections with O(KPN log(N)) operations requiring O(KPN) memory.

35. The method of claim 33, said Partial Effective Rank techniques comprising tracking the effective dimensions of a Krylov subspace as its dimension is increased.

36. The method of claim 34, said projecting comprising using Lanczos algorithm.

37. The method of claim 36, further comprising online sparsity assessment.

38. The method of claim 4, said signal from a transmitting antenna comprises data and pilots.

39. The method of claim 38, comprising using an OFDM pilots layout.

40. The method of claim 4, comprising selecting a set of K subspaces of sampled measurements.

41. The method of claim 40, said selection comprising using compressed sensing and/or sparse representation techniques.

42. The method of claim 41, comprising enlarging the set to form a frame.

43. The method of claim 42, comprising using frames for varying the trade-off between speed and accuracy.

44. The method of claim 13, comprising lowering the Symbol Error Rate at medium to low the Signal to Noise Ratio by using Sparse Common Support Channels assumption.

45. The method of claim 4, using a non-sparse technique comprising using LP interpolation.

46. The method of claim 4, said multipath jointly sparse channels being OFDM channels.

47. The method of one of claim 4, said multipath jointly sparse channels being ultrawide-band communication channels.

48. The method of one of claim 4, said multipath jointly sparse channels being wireless RF channels or a wired channels.

49. An apparatus for estimating multipath jointly sparse channels comprising:
    a transmitting antenna for transmitting a signal;
    a number P of receiving antennas, where P≥2, for receiving a number K of signal components;

a processor configured to:
  estimate the sparsity condition of the multipath jointly sparse channels using Partial Effective Rank techniques for deriving estimates of K,
  estimate the channels by using a non-sparse technique if the sparsity condition is not satisfied, and
  estimate the channels by using a sparse technique if the sparsity condition is satisfied.

50. The apparatus of claim 49, said transmitting antenna being a single antenna belonging to a mobile device.

51. The apparatus of claim 49, said receiving antennas belonging to a base station.

52. A method for estimating multipath jointly sparse channels comprising:
  transmitting a signal from a transmitting antenna;
  determining the number K of signal components received by a number P of receiving antennas, where P≥2;
  said determining comprising calculating K singular values by using singular value decomposition of a matrix ok rank K to which some noise has been added;
  calculating the sequence of the partial effective ranks of said matrix; and
  based on said sequence, determining the rank K.

53. The method of claim 52, the sequence comprising the first singular value; the first, the second singular values; the first, the second and the third singular values; ...; the first, the second, the third, ..., the (K−1)th singular values; the first, the second, the third, ..., the (K−1)th, the Kth singular values.

54. An apparatus for estimating multipath jointly sparse channels comprising:
  a transmitting antenna for transmitting a signal;
  a number P of receiving antennas, where P≥2, for receiving a number K of signal components;
  a receiver for sampling each signal component and obtaining a number N of sampled measurements per jointly sparse channel; and
  a processor configured to:
    estimate the sparsity condition of the multipath jointly sparse channels,
    estimate the channels by using a non-sparse technique if the sparsity condition is not satisfied, and
    estimate the channels by using a sparse technique if the sparsity condition is satisfied.

* * * * *